WILLIAM B. PARISEN.
Improvement in Asphaltic Concrete Pavements.
No. 115,887. Patented June 13, 1871.
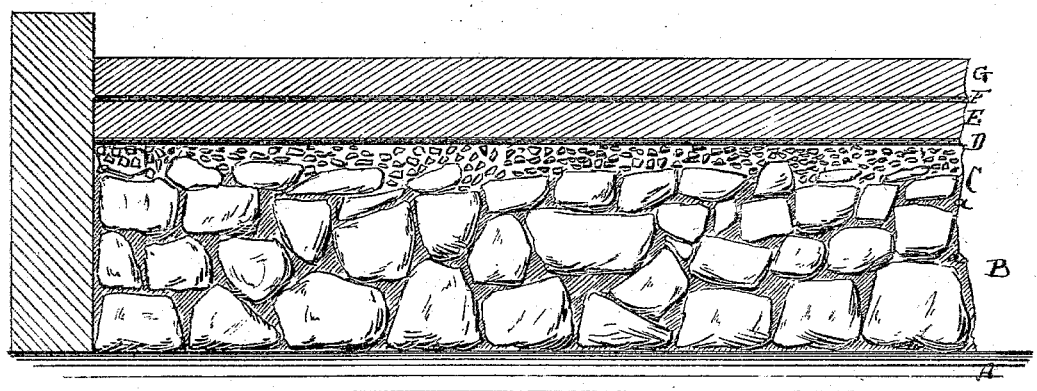

//115,887//

UNITED STATES PATENT OFFICE.

WILLIAM B. PARISEN, OF NEWARK, NEW JERSEY.

IMPROVEMENT IN CONCRETE ASPHALTIC PAVEMENTS.

Specification forming part of Letters Patent No. 115,887, dated June 13, 1871.

*To all whom it may concern:*

Be it known that I, WILLIAM B. PARISEN, of Newark, in the county of Essex and State of New Jersey, have invented a new and useful Improvement in Asphaltic Pavement; and I do hereby declare that the following is a full, clear, and exact description thereof, which will enable others skilled in the art to make and use the same, reference being had to the accompanying drawing forming part of this specification.

The drawing represents a longitudinal section of my improved pavement.

My invention consists in a new combination of materials, in liquid and solid forms, for the fabrication of a bond or cement used in the substratum of the pavement; in a new and peculiar mode of constructing and compressing the substances; and in a novel preparation of the road-bed on dry and wet ground.

My improved pavement is made in the following manner: All previous pavements or obstructions being cleared off, and the natural earth dry, I plow or work up the same to a depth of four to six inches, so as to have the surface perfectly uniform. I then harrow or rake level, and compact with rollers from five to twelve tons weight. If the ground be of a wet or soggy nature, I construct, in cross and lateral sections, blind drains before rolling. For a base of the pavement I take common gas or coal tar, and boil it in open vessels to evaporate volatile matter; then add Trinidad Lake (or dipped) asphaltum, and keep up the boiling process until the asphaltum is thoroughly dissolved. I then take the road metal of blue trap-rock, or equally hard stone, broken in cubes of two to four inches, and perfectly dry and free from dirt, and mix with the liquid. While in the process of mixing I add a very fine screened and hot gravel, best quality calcined plaster of Paris, and Portland cement, the whole being well amalgamated together. It is then, while hot, laid down in an even layer from six to eight inches thick. I then commence a gradual and steady increasing compression, beginning with five-hundred-pound rollers, and, as the materials cool, add heavier rollers up to ten and twelve tons weight. For the second course I take granules of hard rock or blue or black or equally strong gravel, in size from a pea to a hickory-nut, and roast the same without fracturing. I then mix it with a liquid of medium-distilled coal-tar and Portland cement. This, while hot, is carefully worked in the interstices in the surface of the base. It is then rammed down with paving-irons or rammers and rollers of five to ten tons weight. After the rolling is completed I sprinkle over the whole surface a coating of hot liquid only of the same kind as used in the base. I now take a hot liquid formed of six-eighths ($\frac{6}{8}$) of medium distilled coal-tar, one-eighth ($\frac{1}{8}$) of mined Cuban asphaltum, one-eighth ($\frac{1}{8}$) of dipped or Lake Trinidad asphaltum, plaster of Paris or Portland cement, or both, and fine roasted gravel, and amalgamate the whole until it attains a spongy consistency; then, while hot, it is spread over the wedging as thin as possible, (three-quarters of an inch,) and immediately rolled, commencing with five-hundred-pound rollers, and following with increased weights to ten or twelve tons. After rolling I sprinkle over the whole surface a coating of hot liquid, only of the same kind as above described. The next and last course is made and put down the same as the previous course, only omitting the sprinkling or coating of liquid. For coloring the surface I take any common cement and mix with water to the consistency of a thin paste, and apply with brooms over the surface until coated, and, before it sets, smooth over with light rollers. The pavement is now completed and ready for immediate use.

By actual tests on streets of heavy circulation, this pavement has proven its adaptability to hot as well as cold climates. It is impervious to water. By using the amalgam or bond, as stated, the base stratums of stone are firmly bound, spaces filled and made solid, and cannot be moved by the stamping of horses or the attrition of heavy vehicles, while the materials as combined are almost imperishable. By using medium-distilled coal-tar and cement in the second course, I gain two important points: first, elasticity; second, by the attraction of solar heat the adipose matter contained in the coal-tar impregnates in a moderate degree the upper courses, and thereby keeps intact for a long time the fibers of the mastic, while the cement checks too rapid an evaporation. By sprinkling the wedging or second course after rolling, I get a strong coating or adhesion upon which to press the first course of mastic, and by putting the mastic on very thin, the compound is more effective in completely sealing the wedging. By again sprinkling the first course of mastic after its being rolled, I increase power of adhesion, and add to the vitallity of the second course of mastic or the roofing of the work. The ingredients used for coloring form no part of the pavement proper.

In the drawing, A represents the packed road-bed of earth; B, the base of trap-rock, showing the amalgam or bond $a$ filling the spaces C, the wedging pressed into the surface of the base constituting, together with the sprinkled coating D of liquid asphaltum, the second course; while E is the mastic of asphaltum, having a sprinkled coating, F, of liquid asphaltum, and forming the third course. G is the top or fourth course of liquid asphaltum.

Having thus described my invention, what I claim as new, and desire to secure by Letters Patent, is—

1. Fine gravel, Portland cement, plaster of Paris, distilled coal-tar, and asphaltum, combined with the stone by incorporating and mixing it therethrough before the base of the pavement is laid, as and for the purpose specified.

2. The amalgam or bond used with the angular stone forming the base, as set forth.

3. My system of coating with pure hot liquid, as herein specified, between the wedging and first mastic and second mastic courses, and the mode of coloring the surface to a slate color, as set forth.

4. The asphaltic pavement, composed of the several courses, substantially as herein shown and described.

WILLIAM B. PARISEN.

Witnesses:
   GEO. W. MABEE,
   T. B. MOSHER.